(12) United States Patent
Lambert et al.

(10) Patent No.: US 10,579,119 B2
(45) Date of Patent: Mar. 3, 2020

(54) ACTIVE CHARGE THROUGH OF A PERIPHERAL DEVICE

(71) Applicant: Cirrus Logic International Semiconductor Ltd., Edinburgh (GB)

(72) Inventors: Bradley Allan Lambert, Austin, TX (US); Michael A. Kost, Cedar Park, TX (US); Ganesh Saripalli, Austin, TX (US); Gregory C. Yancey, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 80 days.

(21) Appl. No.: 15/937,152

(22) Filed: Mar. 27, 2018

(65) Prior Publication Data

US 2018/0341310 A1 Nov. 29, 2018

Related U.S. Application Data

(60) Provisional application No. 62/510,004, filed on May 23, 2017.

(51) Int. Cl.
*G06F 1/26* (2006.01)
*G06F 13/42* (2006.01)
*H02J 7/00* (2006.01)

(52) U.S. Cl.
CPC .............. *G06F 1/266* (2013.01); *G06F 1/263* (2013.01); *G06F 13/4282* (2013.01); *H02J 7/0052* (2013.01); *G06F 2213/0042* (2013.01); *H02J 2007/0062* (2013.01)

(58) Field of Classification Search
CPC ...... G06F 1/266; G06F 1/263; G06F 13/4282; H02J 7/0052
See application file for complete search history.

(56) References Cited

U.S. PATENT DOCUMENTS

| 8,458,376 | B1* | 6/2013 | Chen | ........................ | G06F 1/266 710/15 |
| 2006/0179165 | A1* | 8/2006 | Chen | ........................ | G06F 1/266 710/5 |

FOREIGN PATENT DOCUMENTS

WO 2016209336 A1 12/2016

OTHER PUBLICATIONS

International Search Report and Written Opinion of the International Searching Authority, International Application No. PCT/GB2018/034108, dated Nov. 26, 2018.

(Continued)

*Primary Examiner* — Stefan Stoynov
(74) *Attorney, Agent, or Firm* — Jackson Walker L.L.P.

(57) ABSTRACT

A method for port policy management for active charge through of a peripheral device that has a first communication port and a second communication port may include detecting whether a valid power connection exists at the peripheral device, in response to detecting the valid power connection, determining a relationship between the first communication port and the second communication port, based on the relationship, determining, by the peripheral device, a power relationship among the peripheral device, the first communication port, and the second communication port, selectively configuring the first communication port, the second communication port, and the peripheral device to match the power relationship, and enabling active charging through of the peripheral device if active charging through is supported by the power relationship.

64 Claims, 12 Drawing Sheets

(56) References Cited

OTHER PUBLICATIONS

"Universal Serial Bus interfaces for data and power—Part 1-3: Universal Serial Bus interfaces—common components—USB Type-C™ cable and connector specification", Aug. 17, 2016, pp. 1-173, IEC, Geneva, Switzerland.

Anonymous; "Literature Download / Request", Apr. 25, 2017, Retrieved from the Internet: https://web.archive.org/web/20170425002207/https://www.xppower.com/Support/Literature-Download-Request [retrieved on Nov. 5, 2018], 8 pages.

Bocock, Gary, "The Essential Guide to Power Supplies", In "The Essential Guide to Power Supplies", Apr. 25, 2017, 5 pages.

\* cited by examiner

ACTIVE CHARGE THROUGH OF A PERIPHERAL DEVICE

RELATED APPLICATION

The present disclosure claims priority to U.S. Provisional Patent Application Ser. No. 62/510,004 filed May 23, 2017, which is incorporated by reference herein in its entirety.

FIELD OF DISCLOSURE

The present disclosure relates in general to circuits for electronic devices, including without limitation audio devices, including personal audio devices such as wireless telephones and media players, and more specifically, to systems and methods relating to providing and managing active charge through of a peripheral device.

BACKGROUND

Electronic devices are prevalent and in everyday use. Electronic devices utilize communication bus protocols to be able to communicate with and transmit/receive power to and from each other in a more uniform or standardized manner Universal bus communication protocols, such as Universal Serial Bus ("USB"), as well as proprietary bus communication protocols, such as the bus protocol for Apple's Lightning® bus connectors, exist and are well known.

USB is a well-known industry bus communication protocol for electronic devices. USB provides a well-defined standard protocol that allows electronic devices to communicate with each other. Various versions of the USB protocol exist, such as USB 1.x, USB 2.0, USB 3.0, USB 3.1. USB-C and USB-PD protocols add the ability to provide power delivery. Apple, Inc. has established its own proprietary bus communication protocol that is compatible and compliant with its Lightning bus connector that allows devices to communicate with and respectively provide/receive power to and from Apple devices.

It is well known that many portable hosts implementing bus communication protocol connectors (such as USB-C or Lightning connectors) provide a single port only that is useful for either communicating data or providing power or both under specific conditions. Hubs and docks provide multiple ports that resolve the single port limitation and have the ability to provide power to an electronic device and a portable host. However, both hubs and docks add a significant amount of complexity and cost to overcoming the single port limitation and power provision problem. Furthermore, hubs and ports (such as USB-C hubs and ports) with at least one downward facing port (DFP) require additional testing for certification (e.g., USB-C certification).

To avoid the complexity of hubs and docks and certification requirements, passthrough charging (or pass-through charging) has been adopted and used in electronic devices via some bus communication protocols. Passthrough charging allows an electronic device that is coupled to a power source and to a host to use the bus communication protocol to allow normal operations between the electronic device and the host, and also to allow charge to pass through the device to a host. The host receives the power/charge from the power source and the host, in turn, powers/charges the electronic device also via the bus communication protocol. Passthrough charging may not allow the power source to directly power/charge the electronic device but always requires that the host first receive the passthrough power/charge and then, secondly in turn, the host uses its power source to power/charge the electronic device. Passthrough charging allows devices to avoid having to have at least one DFP.

FIGS. 1A and 1B illustrate an example Apple Lightning compatible headphone device 10 (or a generic peripheral device) that provides the passthrough charging feature, as is known in the art. FIG. 1A depicts an external view of headphone device 10 while FIG. 1B is an illustration of a block diagram depicting headphone device 10 interfaced with a power charger (PW CHG) 11 and a host 14. Example hosts 14 include but are not limited to smart phones, tablets, and personal computers. Referring to FIGS. 1A and 1B, headphone device 10 may be coupled to host 14 via Lightning port 12B and Lightning host port 16. First contacts of Lightning ports 12B and 16 may be used to provide normal operations and communicate data via data block (DATA) 19 of host 14 and headphone data block (HP DATA) 15 of headphone device 10 between the headphone device 10 and host 14. When power charger 11 is coupled to headphone device 10 via Lightning port 12A, charge may be passed through headphone device 10 via passthrough line (PT) to host 14 from Lightning port 12A through Lighting port 12B to Lightning host port 16. Second contacts of Lightning ports 12B and 16 may be used to provide power between the host 14 and the headphone device 10. Host 14 may receive charge (e.g., from power charger 11) at its battery (BATT) 17. Host 14, in turn, may provide the charge to headphone device 10 by providing charge from its power (PWR) block 18 to headphone power block (HP PWR) 13. In this embodiment, power charger 11 may never directly power/charge headphone device 10, and power/charge for headphone device 10 may also have to be passed through headphone device 10 to host 14 and host 14, in turn, may have to power/charge the headphone device 10. An example of such headphone device 10 is Pioneer Rayz Plus® Lightning headphones/earbuds.

FIGS. 2A, 2B, and 2C illustrate an example adapter device 20, as known in the art, that may allow electronic device operations between it and a host as well as providing passthrough charging which allows charge to pass through the electronic device to the host and may allow powering/charging of the electronic device by the host. FIG. 2A depicts adapter device 20 having bus communication ports 22A, 22B, and 22C. Bus communication ports 22A, 22B, 22C, 12C, and 14A may be Lighting ports, USB-C ports, or any other type of bus communication ports. Ports 22A, 22B, 22C, 12C, and 16A are not limited to any type and can each be of a female type and/or a male type. Similar to host 14, example hosts 14A may include but are not limited to smart phones, tablets, and personal computers.

Referring now to FIG. 2B, headphone device 10A is shown coupled to adapter device 20 via ports 12C and 22B, and host 14A is shown coupled to adapter device 20 via ports 16A and 22C. First contacts of ports 16A, 22C, and 12C may be used to provide normal operations and communicate data via data block (DATA) 19A of host 14A and headphone device data block (HP DATA) 15A of headphone device 10A through adapter device 20. When power charger 11 is coupled to adapter device 20 via port 22A, charge may pass from power charger 11 through adapter device 20 to host 14A (e.g., passthrough charging) via passthrough line (PT) from 22A to port 22C to host port 16A. Second contacts of ports 22C and 16A may be used to provide power from the power charger 11 to the host 14A. Host 14A may receive the charge (e.g., from power charger 11) at its battery (BATT)

17A. Host 14A, in turn, may provide the charge to headphone device 10A through adapter device 20 by providing the power/charge from a power (PWR) block 18A of host 14A to a headphone power block (HP PWR) 13A via ports 16A, 22C, and 22A. In this embodiment, the power charger 11 may never directly power/charge headphone device 10A, and power/charge for the headphone device 10A may also have to be first passed through adapter device 20 from power charger 11 to host 14A and then host 14A, in turn, may have to power/charge headphone device 10A.

Referring now to FIG. 2C, headphone device 10A is shown instead coupled to adapter device 20 via ports 12C and 22A, and host 14A is shown coupled to adapter device 20 via ports 16A and 22C. First contacts of ports 16A, 22C, and 12C may be used to provide normal operations and communicate data via data block (DATA) 19A of host 14A and headphone device data block (HP DATA) 15A of headphone device 10A through the adapter device 20. When power charger 11 is coupled to adapter device 20 via port 22B, charge may be passed from power charger 11 through adapter device 20 to host 14A (e.g., passthrough charging) via passthrough line (PT) from port 22B through port 22C to host port 16A. Second contacts of ports 22C and 16A may be used to provide power from power charger 11 to host 14A. Host 14A may receive the charge (e.g., from power charger 11) at its battery (BATT) 17A. Host 14A, in turn, may provide the charge to headphone device 10A through adapter device 20 by providing the charge from power (PWR) block 18A of host 14A to headphone power block (HP PWR) 13A via ports 16A, 22C, and 22B. In this embodiment, power charger 11 may never directly power/charge headphone device 10A, and power/charge for headphone device 10A may also have to be first passed through adapter device 20 from power charger 11 to host 14A and then host 14A, in turn, may have to power/charge headphone device 10A.

An example of such adapter device 20 is Belkin International Inc.'s Lightning Audio+Charge RockStar™ adapter. Also, as indicated before, another example of adapter device 20 is a USB-C adapter device that may provide a passive analog audio adapter with passthrough charging capability. Such a USB-C adapter may have the three ports 22A, 22B, and 22C in which ports 22A and 22B may be the respective headphone (e.g., data) port and power port while port 22C may be the host port. However, such a USB-C adapter device has limits to minimum default power (e.g., 500 milliamps), and thus charge times of the host may be long. Also, such adapter may be a fixed function analog interface and thus may not support any of the other functions defined by the USB standard (e.g., mass storage device, keyboard, mouse, etc.).

Peripheral devices are well known in the art. A peripheral device is not a hub or a dock or an adapter device, such as adapter device 20. A peripheral device may be an ancillary device that is used to communicate information to a host and vice versa. One key disadvantage of existing approaches to passthrough charging is that power provided through a power charger may have to be managed and split between the host and the peripheral device. FIG. 3 illustrates an example high-level block diagram depicting this disadvantage of existing approaches to passthrough charging. Passthrough charging using existing approaches may be done serially, such that power from a power charger is provided serially. Because power is provided serially, the amount of power being provided to the host and peripheral device may need to be split accordingly. Also, the amount of power being provided by the power charger 11 may be limited to the maximum power that the host 14 is able to receive. In the example of FIG. 3, the block diagram depicts that power charger 11 may be capable of providing 12 watts. The 12 watts provided by power charger 11 may be passed through the peripheral device 10 via passthrough line (PT) and may first be received by host 14. Because host 14 needs to in turn provide peripheral device 10 with 3 Watts (3 W), host 14 is powered with only the remaining 9 Watts (9 W=12 W−3 W). Another key disadvantage is that if the host 14 is not coupled to peripheral device 10, using existing approaches, peripheral device 10 cannot be charged at all because power charger 11 cannot directly charge peripheral device 10. Such a direct charging feature is important and beneficial if peripheral device 10 is to be a standalone or wireless device, such as a wireless headphone/headset/earbuds.

SUMMARY

In accordance with the teachings of the present disclosure, one or more disadvantages and problems associated with providing and managing active charge through in a peripheral device may be reduced or eliminated.

In accordance with embodiments of the present disclosure, a method may be provided for port policy management for active charge through of a peripheral device that operates on a communication protocol and has a first communication port and a second communication port, wherein the first communication port and the second communication port each comprises a respective first electrical contact for carrying signals of the communication protocol, and a respective second electrical contact for transmitting and receiving electrical power from a source of electrical energy. The method may include detecting whether a valid power connection exists at the peripheral device, in response to detecting the valid power connection, determining a relationship between the first communication port and the second communication port, based on the relationship, determining, by the peripheral device, a power relationship among the peripheral device, the first communication port, and the second communication port, selectively configuring the first communication port, the second communication port, and the peripheral device to match the power relationship, and enabling active charging through of the peripheral device if active charging through is supported by the power relationship.

In accordance with these and other embodiments of the present disclosure, a method may be provided for port policy management for active charge through of a peripheral device that operates on a communication protocol and has a first communication port and a second communication port, wherein the first communication port and the second communication port each comprises a respective first electrical contact for carrying signals of the communication protocol, and a respective second electrical contact for transmitting and receiving electrical power from a source of electrical energy. The method may include estimating power losses associated with charging a host coupled to the device through one of the first communication port and the second communication port and accounting for the power losses when the power is being provided to the host via active charging through of the peripheral device between the second electrical contact of the first communication port and the second electrical contact of the second communication port.

In accordance with these and other embodiments of the present disclosure, a peripheral device that operates on a communication protocol may be integral to a peripheral device assembly including a first communication port, a second communication port, wherein the first communication port and the second communication port each comprises a respective first electrical contact for carrying signals of the communication protocol and a respective second electrical contact for transmitting and receiving electrical power from a source of electrical energy, and a peripheral device, wherein the peripheral device may be configured to perform port policy management for active charge through of the peripheral device. The peripheral device may be configured to detect whether a valid power connection exists at the peripheral device, in response to detecting the valid power connection, determining a relationship between the first communication port and the second communication port, based on the relationship, determine a power relationship among the peripheral device, the first communication port, and the second communication port, selectively configure the first communication port, the second communication port, and the peripheral device to match the power relationship, and enable active charging through of the peripheral device if active charging through is supported by the power relationship.

In accordance with these and other embodiments of the present disclosure, a peripheral device that operates on a communication protocol may be integral to a peripheral device assembly including a first communication port, a second communication port, wherein the first communication port and the second communication port each comprises a respective first electrical contact for carrying signals of the communication protocol and a respective second electrical contact for transmitting and receiving electrical power from a source of electrical energy, and a peripheral device, wherein the peripheral device may be configured to perform port policy management for active charge through of the peripheral device. The peripheral device may be further configured to estimate power losses associated with charging a host coupled to the device through one of the first communication port and the second communication port and account for the power losses when the power is being provided to the host via active charging through of the peripheral device between the second electrical contact of the first communication port and the second electrical contact of the second communication port.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

A system and method for port policy management in actively charging through a peripheral device that has a first communication port and a second communication port are disclosed. A host and a power charger may couple to the peripheral device. The peripheral device, host, power charger, and other such devices and their respective ports may communicate and transmit/receive power in accordance with a communication bus protocol. Such a protocol may include but is not limited to standard protocols, such as USB protocols (USB-C and USB-PD protocols), or a proprietary bus communication protocol, including but not limited to the proprietary bus communication protocol that supports and is compatible/compliant with the Apple Lightning bus connector.

Figure 1A:
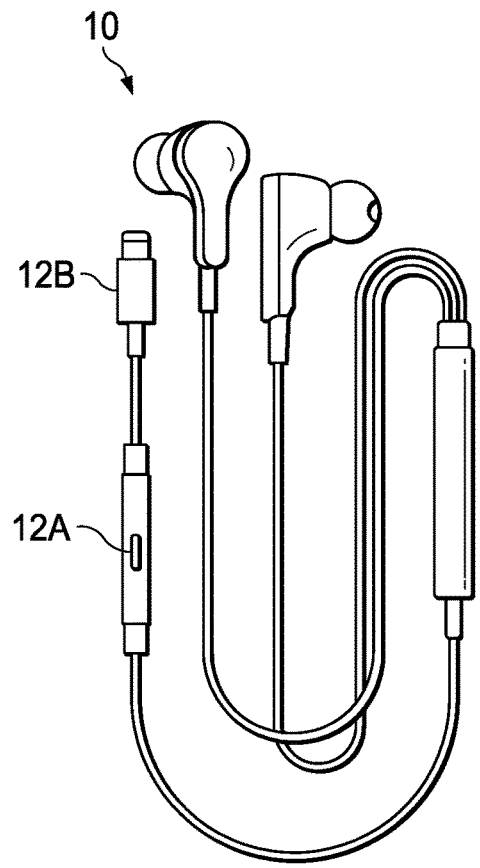
FIGS. 1A and 1B illustrate an example Apple Lightning compatible headphone device 10 or peripheral device that may provide passthrough charging, as is known in the art.
Figure 1B:
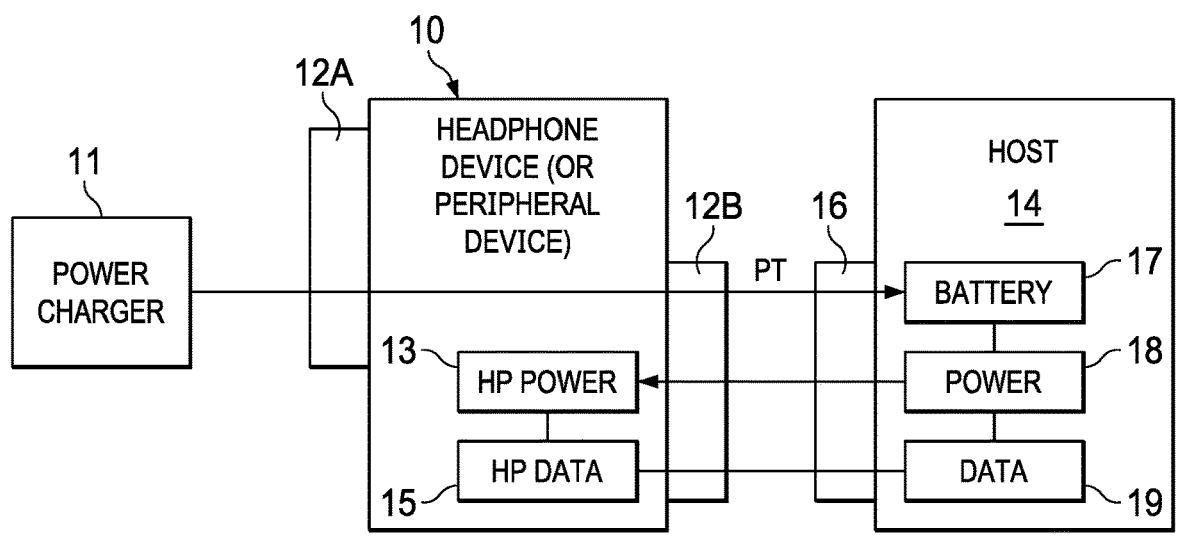
Figure 2A:
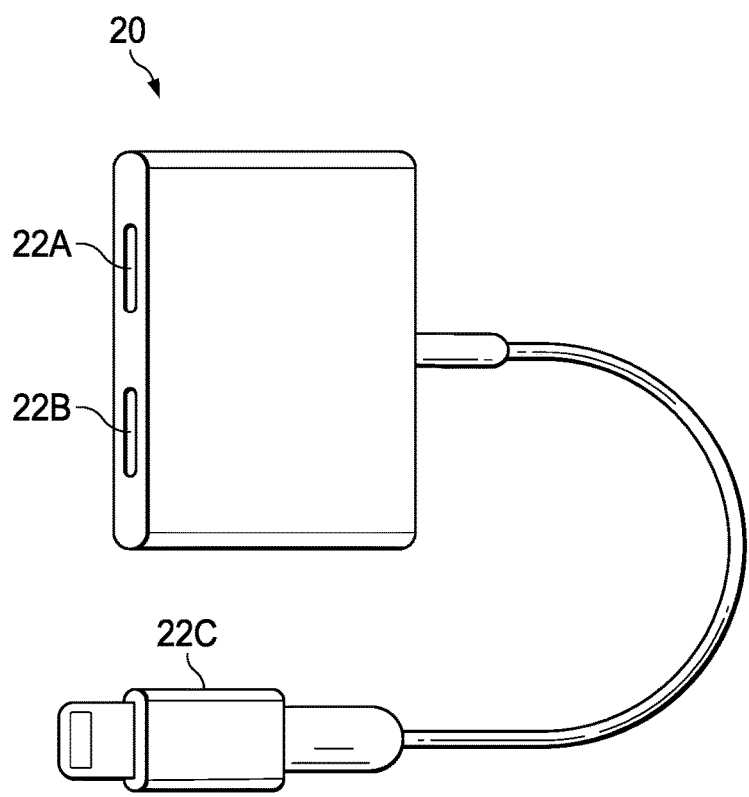
FIGS. 2A, 2B, and 2C illustrate an example Belkin International Inc.'s Lightning Audio+Charge RockStar™ adapter that may provide passthrough charging, as is known in the art.
Figure 2B:
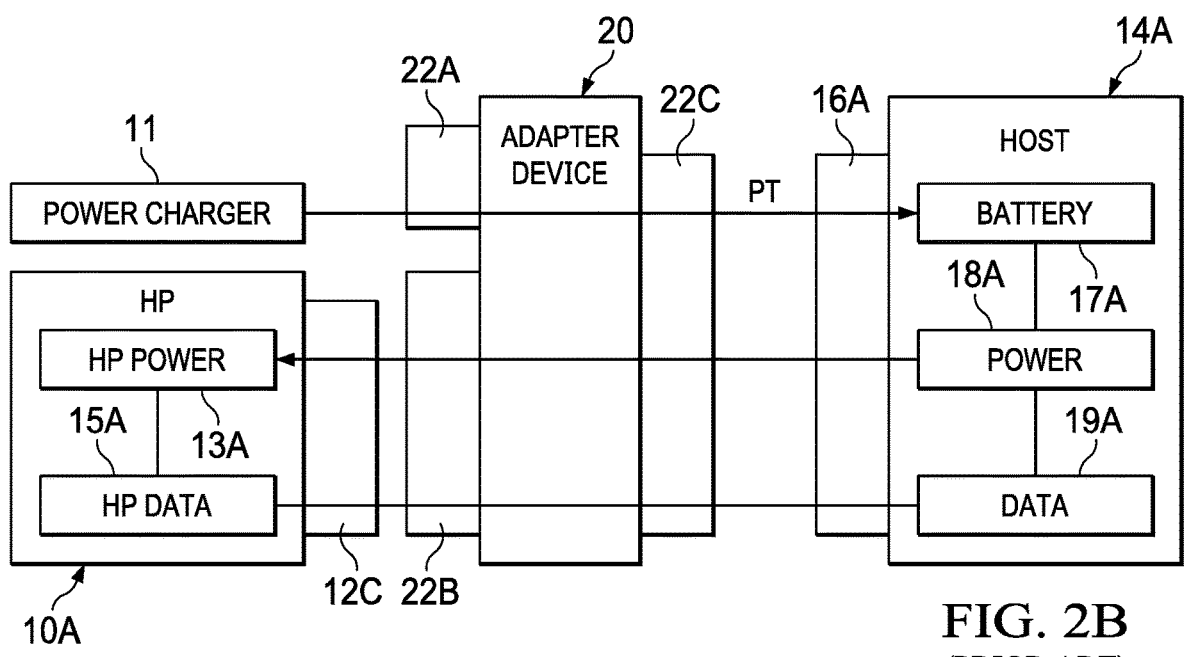
Figure 2C:
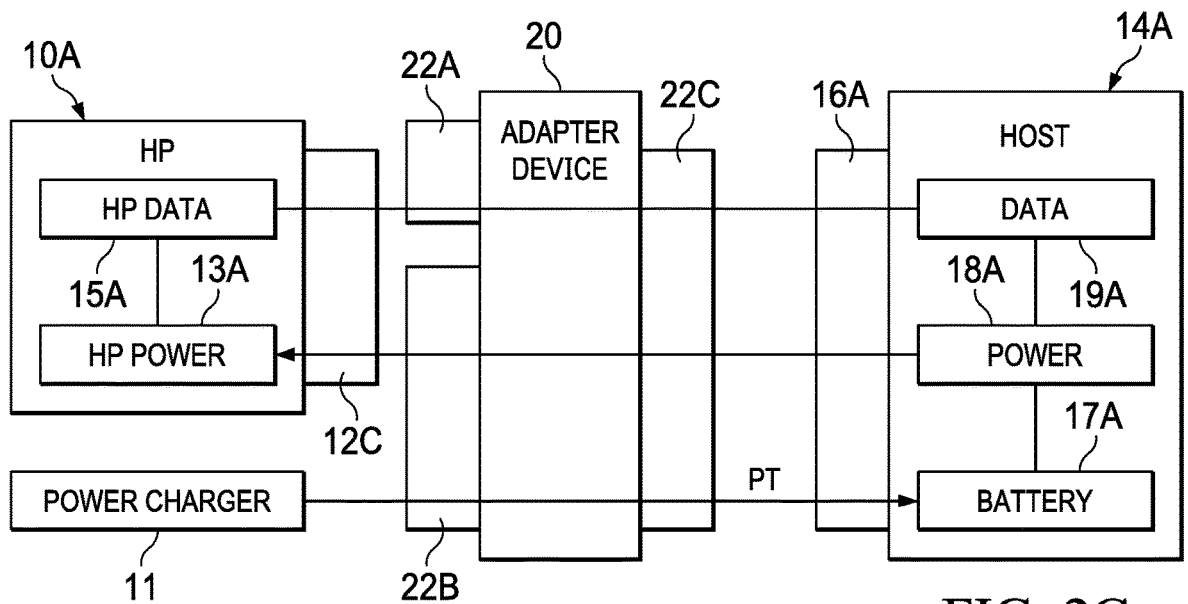
Figure 3:
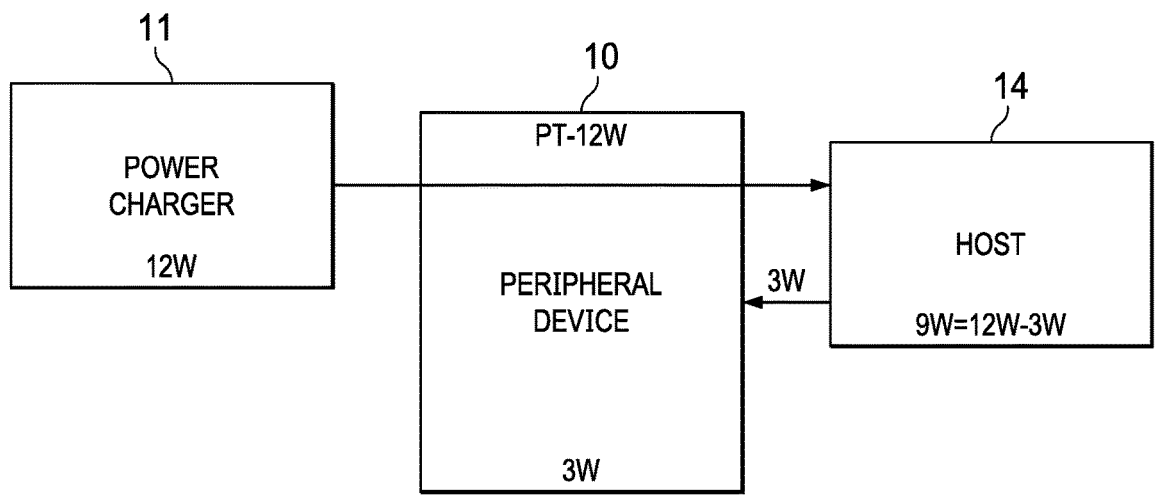
FIG. 3 illustrates an example high-level block diagram of passthrough charging, as is known in the art.
Figure 4:
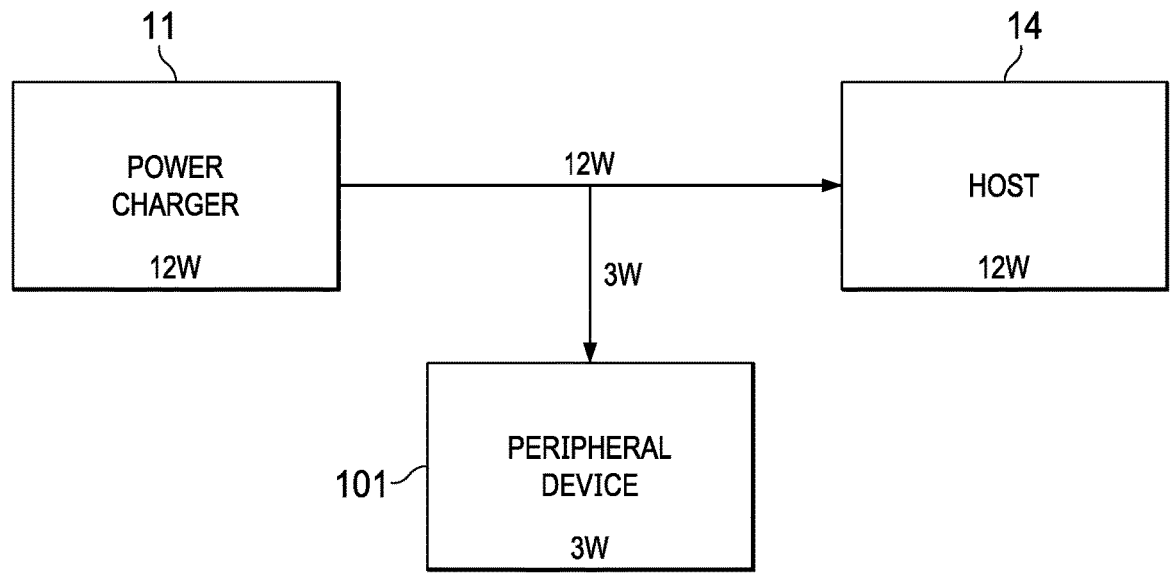
FIG. 4 illustrates an example high-level block diagram of a system for active charge through, in accordance with embodiments of the present disclosure.

FIG. 4 illustrates an example high-level block diagram of a system for active charge through, in accordance with embodiments of the present disclosure. In contrast to existing approaches to passthrough charging that perform charge through in a serial manner, in the system depicted in FIG. 4, active charge through may be performed in parallel, such that power is provided in parallel to both a peripheral device and a host. Because power is provided in parallel, the amount of power being provided to the host and the peripheral device does not need to be split as required by existing approaches (e.g., as shown in FIG. 3). In the example of FIG. 4, power charger 11 may provide 15 watts, as opposed to the 12 watts provided in the prior art system of FIG. 3. For example, 12 watts of the 15 watts provided by power charger 11 may be directly provided to host 14 and is not passed through peripheral device 101. Because peripheral device 101 is also directly coupled to power charger 11 and because host 14 does not need to manage and in turn provide power to peripheral device 101, peripheral device 101 may obtain 3 watts directly from power charger 11 without any loss or reduction of power being provided from power charger 11 to host 14. Such a direct charging feature for peripheral device 101 is beneficial because peripheral device 101 may be a standalone or wireless device, such as a wireless headphone/ headset/earbuds. Such an approach to active charge through may allow a peripheral device to be charged without the presence of a host.

Figure 5A:
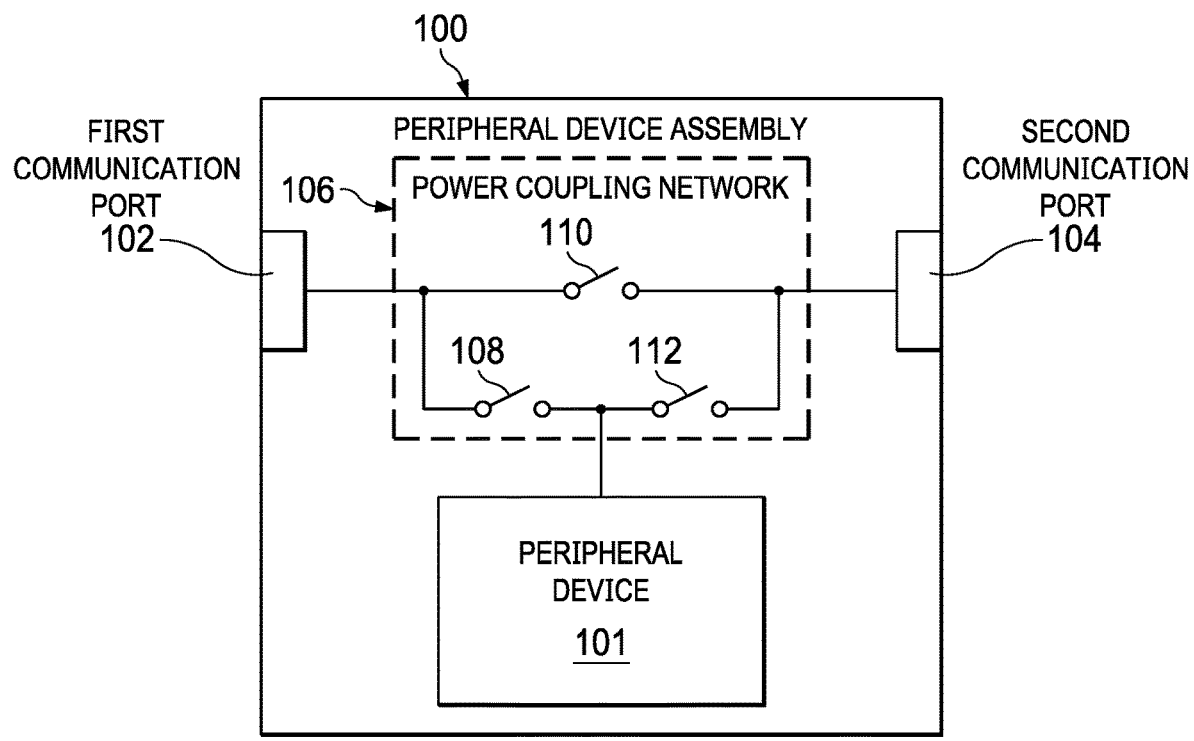
FIG. 5A illustrates an example diagram of a peripheral device with a first communication port, a second communication port, and a power coupling network that allows for active charge through operation, in accordance with embodiments of the present disclosure.

FIG. 5A illustrates an example peripheral device assembly 100 having a peripheral device 101, a first communication port 102, a second communication port 104, and a power coupling network 106, in accordance with embodiments of the present disclosure. Power coupling network 106 may have switches 108, 110, and 112 coupled in the manner shown in FIG. 5A. When only first communication port 102 provides a valid power connection, switch 108 may be activated and switches 110 and 112 may remain inactive. Thus, in such a scenario, power may only be provided from first communication port 102 to peripheral device 101. By switches 110 and 112 remaining inactive, second communication port 104 may be isolated from the peripheral device 101 and first communication port 102. When only second communication port 104 provides a valid power connection, switch 112 may be activated and switches 110 and 108 may remain inactive. Thus, in this case, power is only provided from second communication port 104 to peripheral device 101. By switches 110 and 108 remaining inactive, first communication port 102 may be isolated from the peripheral device 101 and second communication port 104.

One skilled in the art may recognize that first communication port 102 and second communication port 104 may be logically and operationally equivalent, and thus the description below of the various embodiments of the disclosure for one of the ports may apply to the other, as appropriate.

Figure 5B:
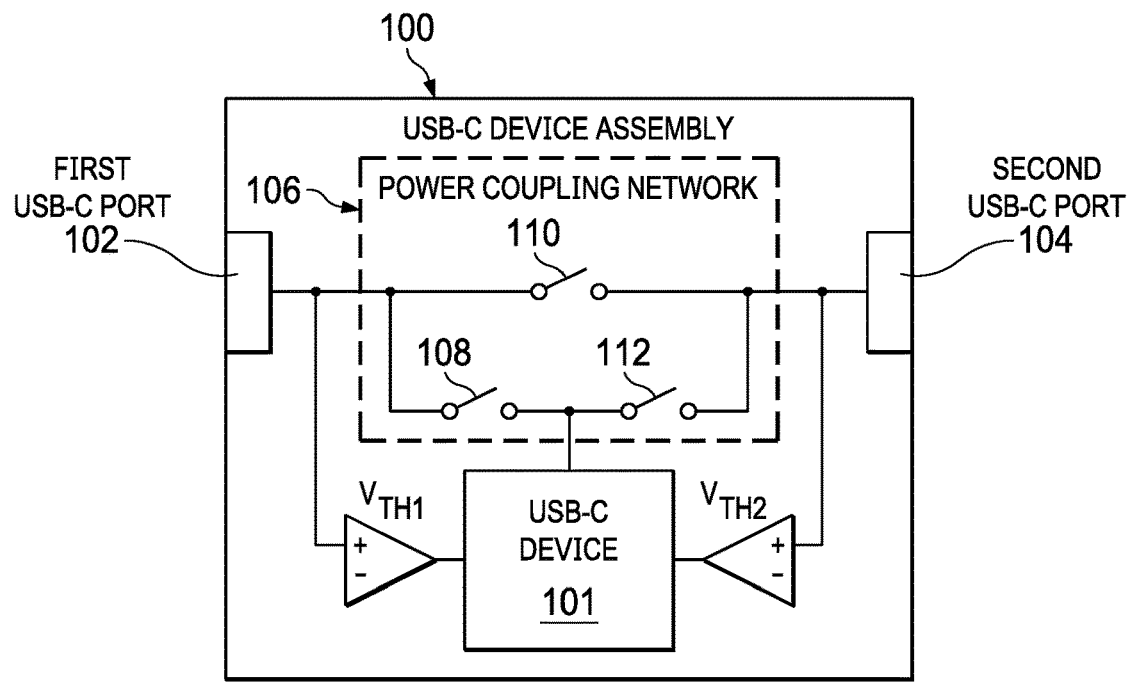
FIG. 5B illustrates another example diagram of a peripheral device with a first communication port, a second communication port, and a power coupling network that uses threshold voltages to enable or disable active charge through operation, in accordance with embodiments of the present disclosure.

FIG. 5B illustrates another example diagram of a peripheral device 101 implemented as a USB-C device in a USB-C device assembly with a first communication port 102 (first USB-C port 102), a second communication port 104 (second USB-C port 104), and a power coupling network 106 that uses threshold voltages $V_{TH1}$ and $V_{TH2}$ to enable or disable active charge through operation, in accordance with embodiments of the present disclosure. FIG. 5B may be identical to FIG. 5A in all material respects except that FIG. 5B depicts peripheral device 101 as a USB-C device that uses threshold voltages $V_{TH1}$ and $V_{TH2}$.

Figure 6A:
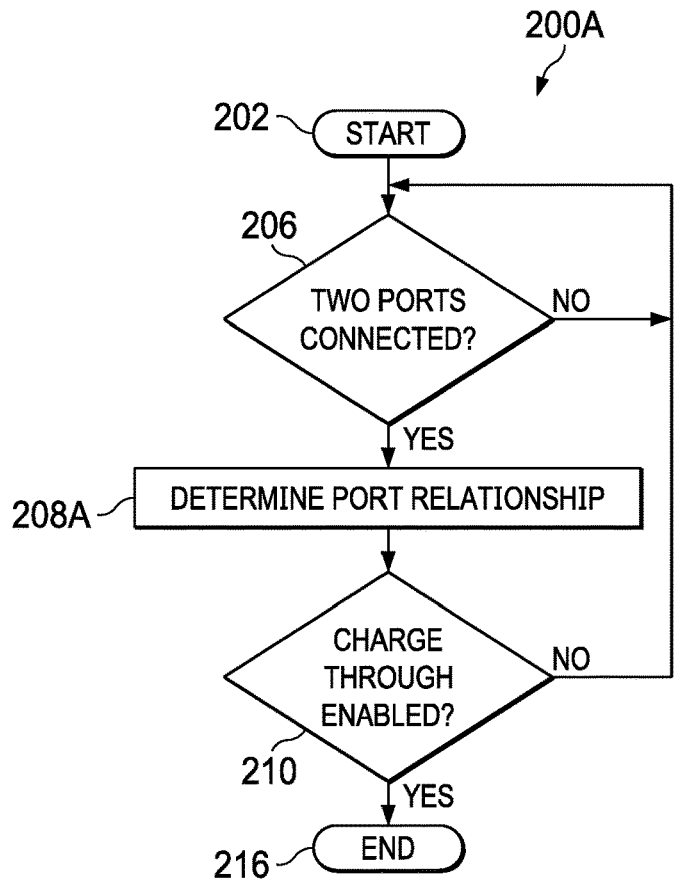
FIG. 6A illustrates an example flowchart of a method for active charge through entry for a peripheral device, in accordance with embodiments of the present disclosure.
Figure 7A:
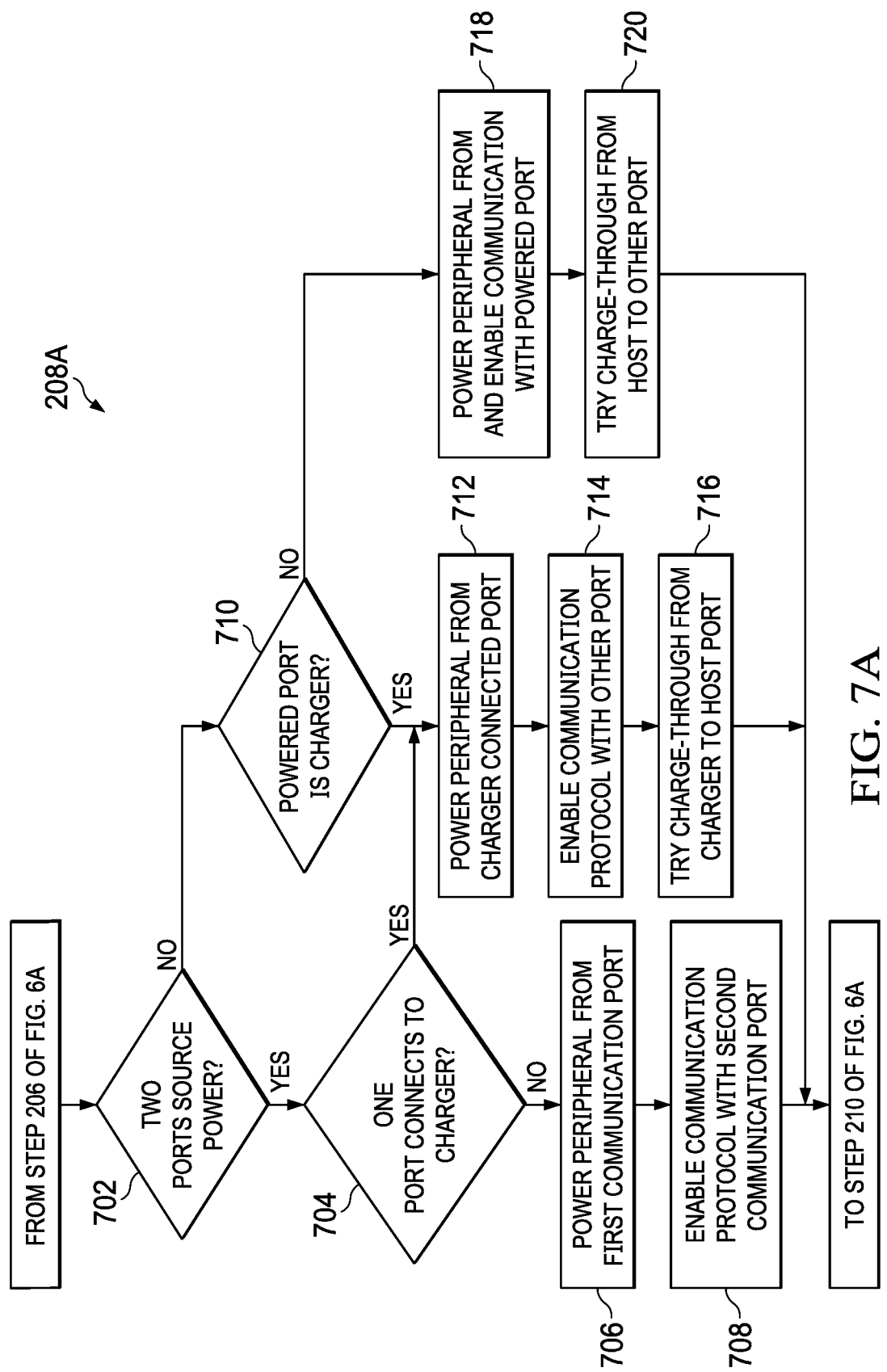
FIG. 7A illustrates an example flowchart of a method for determining the port relationship within a peripheral device, in accordance with embodiments of the present disclosure.

FIG. 6A illustrates an example flowchart of a method 200A for active charge through entry for a peripheral device 101, in accordance with embodiments of the present disclosure. As noted above, teachings of the present disclosure may be implemented in a variety of configurations of peripheral device assembly 100. As such, the preferred initialization point for method 200A and the order of the steps comprising method 200A may depend on the implementation chosen. According to certain embodiments, method 200 may begin at step 202. At step 206, peripheral device 101 may make a determination whether a physical connection exists at both first communication port 102 and second communication port 104. If at step 206, peripheral device 101 determines that a physical connection does not exist at both first communication port 102 and second communication port 104, then method 200A may remain at step 206 until such determination is made. On the other hand, if peripheral device 101 determines that a physical connection does exist at both first communication port 102 and second communication port 104, method 200A may proceed to step 208A, at which peripheral device 101 may determine a port relationship within peripheral device 101 of FIG. 5A. FIG. 7A, described in further detail below, depicts an example flowchart of a method for carrying out step 208A. At step 210, peripheral device 101 may determine whether active charge through is enabled on peripheral device 101. If peripheral device 101 determines that active charge through is not to be enabled, then method 200A may proceed again to step 206. Otherwise, if peripheral device 101 determines that active charge through is enabled, method 200A may end at step 216.

Although FIG. 6A discloses a particular number of steps to be taken with respect to method 200A, method 200A may be executed with greater or fewer steps than those depicted in FIG. 6A. In addition, although FIG. 6A discloses a certain order of steps to be taken with respect to method 200A, the steps comprising method 200A may be completed in any suitable order.

Method 200A may be implemented using peripheral device 101, components thereof, or any other system operable to implement method 200A. In certain embodiments, method 200A may be implemented partially or fully in software and/or firmware embodied in computer-readable media.

Figure 6B:
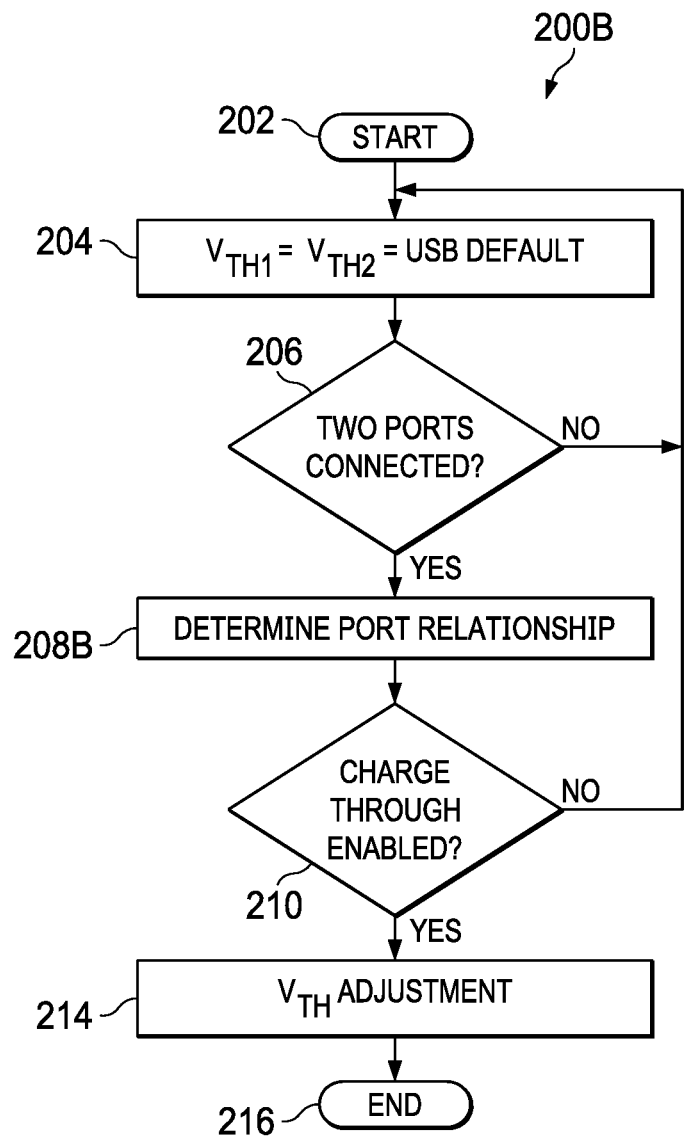
FIG. 6B illustrates an example flowchart of a method for active charge through entry for a peripheral device that is a USB-C device, in accordance with embodiments of the present disclosure.
Figure 7B:
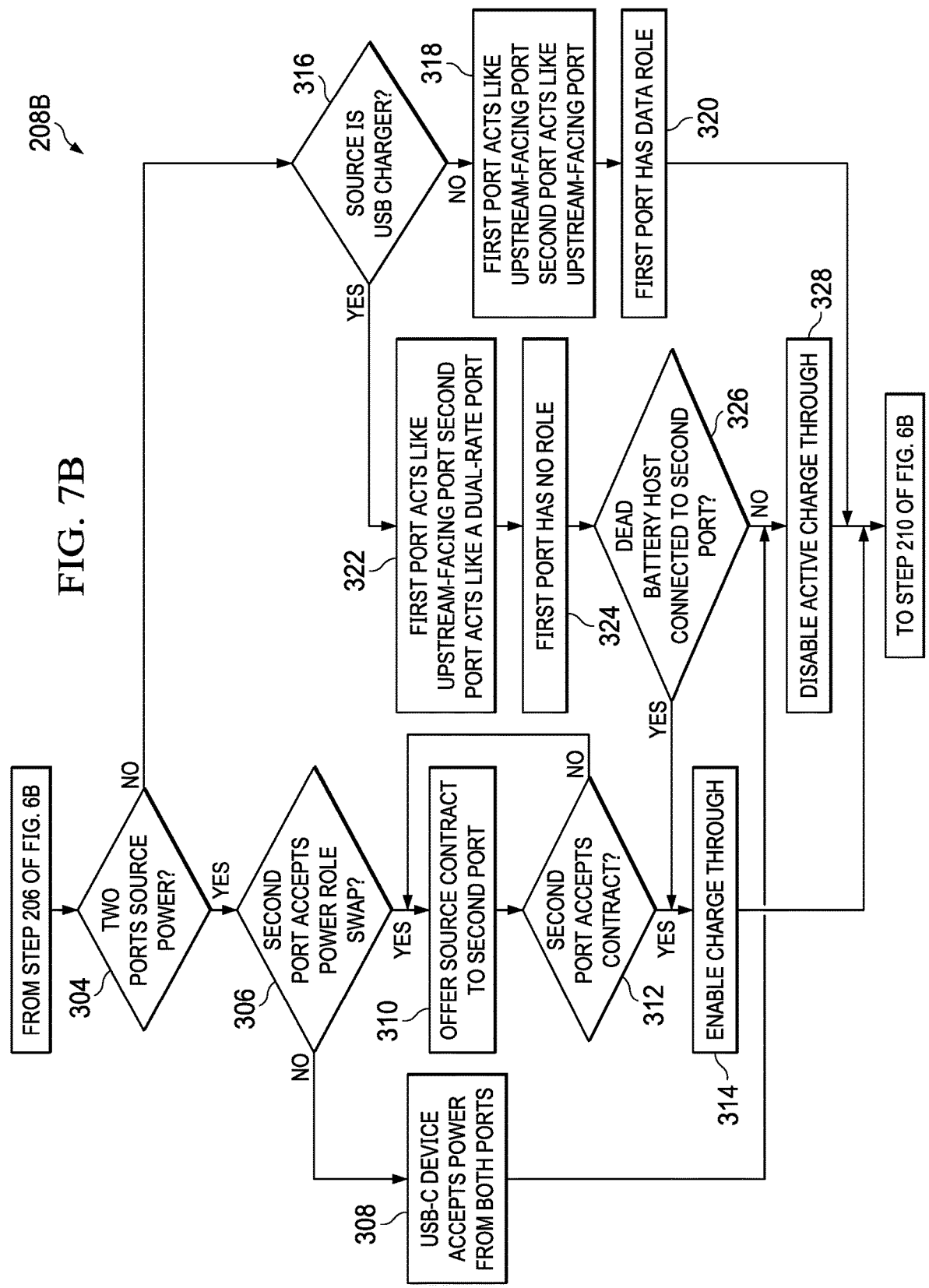
FIG. 7B illustrates an example flowchart of a method for determining the port relationship within a peripheral device that is a USB-C device, in accordance with embodiments of the present disclosure.
Figure 8:
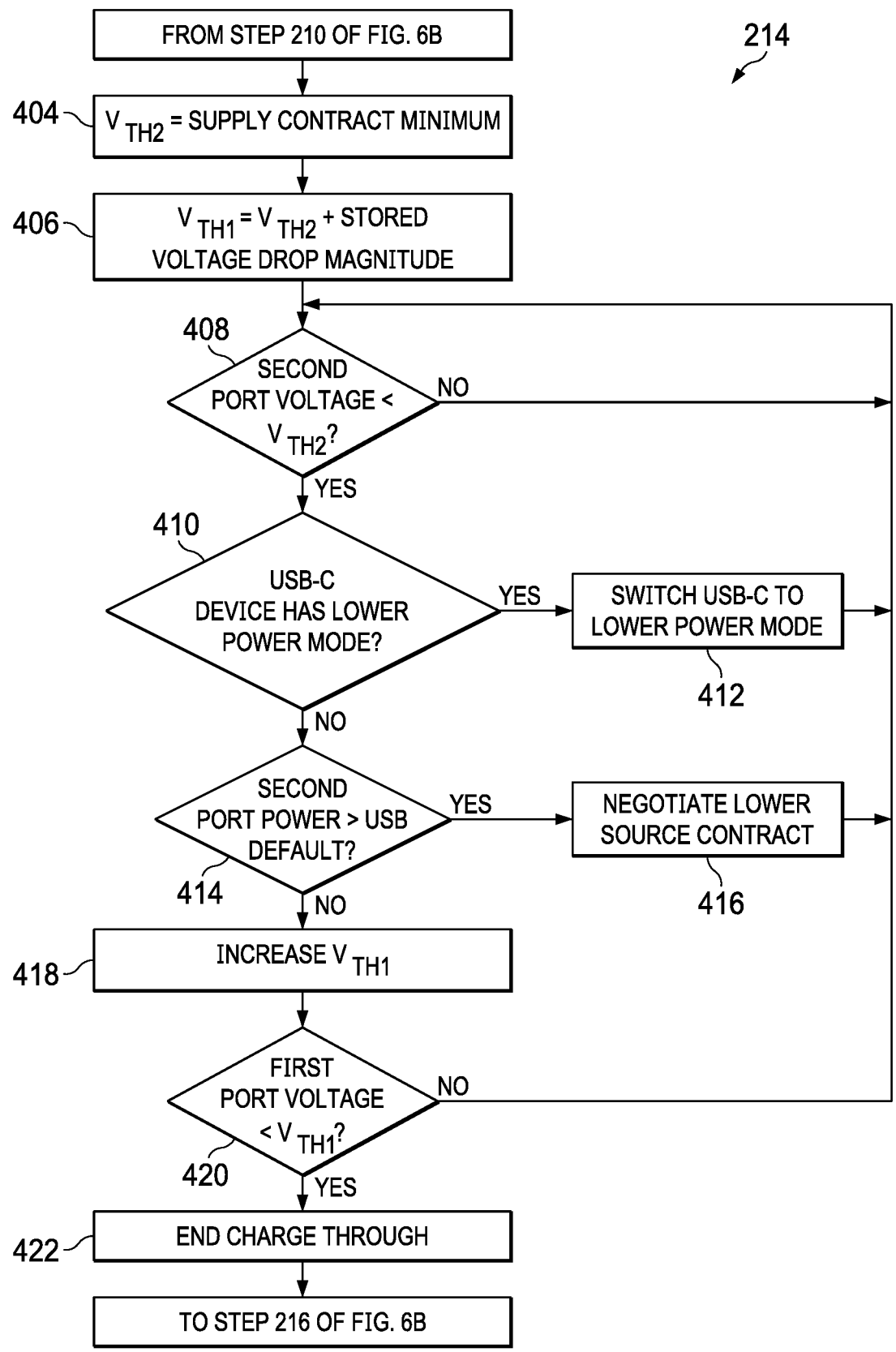
FIG. 8 illustrates an example flowchart of a method for adjusting a threshold voltage associated with a peripheral device, in accordance with embodiments of the present disclosure.

FIG. 6B illustrates an example flowchart of a method 200B for active charge through entry for a peripheral device 101 that is a USB-C device (e.g., as shown in FIG. 5B), in accordance with embodiments of the present disclosure. As noted above, teachings of the present disclosure may be implemented in a variety of configurations of peripheral device assembly 100. As such, the preferred initialization point for method 200B and the order of the steps comprising method 200B may depend on the implementation chosen. Method 200B may be similar in many material respects to method 200A described above. Accordingly, for purposes of clarity and exposition, only the material differences between method 200B and method 200A may be discussed below. In method 200B, a step 204 may be added between steps 202 and 206, a step 214 may be added between steps 210 and 216, and a step 208B may be used instead of step 208A. In method 200B, at step 204, peripheral device 101 may cause a first threshold voltyage $V_{TH1}$ to be made equal to a second threshold voltage $V_{TH2}$, such that both threshold voltages are made equal to a USB default voltage value in accordance with the USB-C specification. At step 206, peripheral device 101 may make a determination whether a physical connection exists at both first communication port 102 and second communication port 104. If at step 206, peripheral device 101 determines that a physical connection does not exist at both first communication port 102 and second communication port 104, then method 200B may remain at step 206 until such determination is made. On the other hand, if peripheral device 101 determines that a physical connection does exist at both first communication port 102 and second communication port 104, method 200B may proceed to step 208B, at which peripheral device 101 may determine a port relationship within peripheral device 101 of FIG. 5B. FIG. 7B, described in further detail below, depicts an example flowchart of a method for carrying out step 208B. At step 210, peripheral device 101 may determine whether active charge through is enabled on peripheral device 101. If peripheral device 101 determines that active charge through is not to be enabled, then method 200B may proceed again to step 206. Otherwise, if peripheral device 101 determines that active charge through is enabled, method 200B may proceed to step 214. At step 214, peripheral device 101 may cause a threshold voltage adjustment to be made. FIG. 8, described in further detail below, depicts an example flowchart of a method for carrying out step 214. After completion of step 214, method 200 may end at step 216.

Although FIG. 6B discloses a particular number of steps to be taken with respect to method 200B, method 200B may be executed with greater or fewer steps than those depicted in FIG. 6B. In addition, although FIG. 6B discloses a certain order of steps to be taken with respect to method 200B, the steps comprising method 200B may be completed in any suitable order.

Method 200B may be implemented using peripheral device 101, components thereof, or any other system operable to implement method 200B. In certain embodiments, method 200B may be implemented partially or fully in software and/or firmware embodied in computer-readable media.

FIG. 7A illustrates an example flowchart of a method 208A for determining the port relationship within a peripheral device 101, in accordance with embodiments of the present disclosure. As noted above, teachings of the present disclosure may be implemented in a variety of configurations of peripheral device assembly 100. As such, the preferred initialization point for method 208A and the order of the steps comprising method 208A may depend on the implementation chosen. According to certain embodiments, method 208A may begin at step 702. At step 702, peripheral device 101 may determine whether the two ports (e.g., first communication port 102 and second communication port 104) are providing power. If at step 702, peripheral device 101 determines that both of the two ports are providing power, then method 208A may proceed to step 704. Otherwise, if peripheral device 101 determines at least one of the two ports is not providing power, then method 208B may proceed to step 710.

At step 704, peripheral device 101 may determine whether one of the two ports (e.g., either first communication port 102 or second communication port 104) is coupled to a power charger (e.g., power charger 11). If peripheral device 101 determines that neither of the two ports is connected to a power charger, method 208A may proceed to step 706. Otherwise, if peripheral device 101 determines that one of the two ports is connected to a power charger, method 208A may proceed to step 712.

At step 706, peripheral device 101 may be powered from the first communication port 102. At step 708, peripheral device 101 may enable second communication port 104 for communication with the bus communication protocol. After completion of step 708, step 208A of method 200 may proceed to step 210 of method 200.

At step 710, peripheral device 101 may determine whether a port providing power (e.g., a powered port) is being powered by a power charger. If peripheral device 101 determines that a powered port is being powered by a power charger, method 208A may proceed to step 712.

At step 712, peripheral device 101 may be powered from the powered port being powered by a power charger. At step 714, peripheral device 101 may enable the other port (e.g., the non-powered port) as a host port for communication with the bus communication protocol. At step 716, peripheral device 101 may attempt or allow active charge through from the powered port being powered by a power charger to the host port to enable charging of a host coupled to peripheral device 101. After completion of step 716, step 208A of method 200 may proceed to step 210 of method 200.

At step 718, peripheral device 101 may be powered from the powered port being powered by a power charger and peripheral device 101 may enable the same port for communication with the bus communication protocol. At step 720, peripheral device 101 may attempt or allow active charge through from a host coupled to peripheral device 101 to the other port (e.g., the non-powered port). After completion of step 720, step 208A of method 200 may proceed to step 210 of method 200.

Although FIG. 7A discloses a particular number of steps to be taken with respect to method 208A, method 208A may be executed with greater or fewer steps than those depicted in FIG. 7A. In addition, although FIG. 7A discloses a certain order of steps to be taken with respect to method 208A, the steps comprising method 208A may be completed in any suitable order.

Method 208A may be implemented using peripheral device 101, components thereof, or any other system operable to implement method 208A. In certain embodiments, method 208A may be implemented partially or fully in software and/or firmware embodied in computer-readable media.

FIG. 7B illustrates an example flowchart of a method 208B for determining the port relationship within peripheral device 101 implemented as a USB-C device, in accordance with embodiments of the present disclosure. As noted above, teachings of the present disclosure may be implemented in a variety of configurations of peripheral device assembly 100. As such, the preferred initialization point for method 208B and the order of the steps comprising method 208B may depend on the implementation chosen. According to certain embodiments, method 208B may begin at step 304. At step 304, peripheral device 101 may determine whether the two ports (e.g., first communication port 102 and second communication port 104) are providing power. If at step 304, peripheral device 101 determines that both of the two ports are providing power, then method 208B may proceed to step 306. Otherwise, if peripheral device 101 determines that at least one of the two ports are not providing power, then method 208B may proceed to step 316.

At step 306, peripheral device 101 may determine whether second USB-C port 104 is willing to accept a power role swap. If second USB-C port 104 is not willing to accept a power role swap, then method 208B may proceed to step 308. Otherwise, if USB-C port 104 is willing to accept a power role swap, then method 208B may proceed to step 310.

At step 308, peripheral device 101 may accept both first USB-C port 102 and second USB-C port 104 acting as power sources. After completion of step 308, method 208B may proceed to step 328.

At step 310, peripheral device 101 may offer a power contract to second USB-C port 104 (e.g., power contract is negotiated). At step 312, peripheral device 101 may determine whether second USB-C port 104 accepts the power contract. If second USB-C port 104 does not accept the power contract, method 208B may proceed again to step 310. On the other hand, if second USB-C port 104 accepts the power contract, method 208B may proceed to step 314. At step 314, peripheral device 101 may enable active charge through. After completion of step 314, step 208B of method 200 may proceed to step 210 of method 200.

At step 316, peripheral device 101 may determine whether the power source is a USB charger. If peripheral device 101 determines that the power source is not a USB charger, method 208B may proceed to step 318. Otherwise, if peripheral device 101 determines that the power source is a USB charger, method 208B may proceed to step 322.

At step 318, peripheral device 101 may cause both first USB-C port 102 and second USB-C port 104 to operate as Upstream Facing Ports. At step 320, peripheral device 101 may cause first USB-C port 102 to provide a data role in communication. After completion of step 320, step 208B of method 200 may proceed to step 210 of method 200.

At step 322, peripheral device 101 may cause first USB-C port 102 to operate as an Upstream Facing Port and second USB-C port 104 to operate as a dual-rate port. At step 324, peripheral device 101 may cause first USB-C port 102 to have no data role in communication. At step 326, peripheral device 101 may determine whether a dead battery is coupled to second USB-C port 104. If peripheral device 101 determines that a dead battery is coupled to second USB-C port 104, method 208B may proceed to step 314. On the other hand, if peripheral device 101 determines that a dead battery is not connected to second USB-C port 104, method 208B may proceed to step 328, at which peripheral device 101 may disable active charge through. After completion of step 328, step 208B of method 200 may proceed to step 210 of method 200.

Although FIG. 7B discloses a particular number of steps to be taken with respect to method 208B, method 208B may be executed with greater or fewer steps than those depicted in FIG. 7B. In addition, although FIG. 7B discloses a certain order of steps to be taken with respect to method 208B, the steps comprising method 208B may be completed in any suitable order.

Method 208B may be implemented using peripheral device 101, components thereof, or any other system operable to implement method 208B. In certain embodiments, method 208B may be implemented partially or fully in software and/or firmware embodied in computer-readable media.

FIG. 8 illustrates an example flowchart of a method 214 for adjusting a threshold voltage $V_{TH}$ associated with peripheral device 101 implemented as a USB-C device, in accordance with embodiments of the present disclosure. Threshold voltage $V_{TH}$ is based on a relationship between first threshold voltage $V_{TH1}$ and second threshold voltage $V_{TH2}$ shown in FIG. 5B. As noted above, teachings of the present disclosure may be implemented in a variety of configurations of peripheral device assembly 100. As such, the preferred initialization point for method 214 and the order of the steps comprising method 214 may depend on the implementation chosen. According to certain embodiments, method 214 may begin at step 404. At step 404, peripheral device 101 may set second threshold voltage $V_{TH2}$ equal to a supply contract minimum. At step 406, peripheral device 101 may set first threshold voltage $V_{TH1}$ equal to a sum of second threshold voltage $V_{TH2}$ and voltage stored voltage drop magnitude. At step 408, peripheral device 101 may determine whether the voltage at second USB-C port 104 is less than second threshold voltage $V_{TH2}$. If the voltage at second USB-C port 104 is not less than second threshold voltage $V_{TH2}$, then method 214 may remain at step 408 until the voltage at second USB-C port 104 is less than second threshold voltage $V_{TH2}$. Otherwise, if the voltage at second USB-C port 104 is less than second threshold voltage $V_{TH2}$, method 214 may proceed to step 410.

At step 410, peripheral device 101 may determine whether peripheral device 101 has a lower power mode. If peripheral device 101 has a lower power mode, method 214 may proceed to step 412. Otherwise, if peripheral device 101 does not have a lower power mode, method 214 may proceed to step 414.

At step 412, peripheral device 101 may switch to its lower power mode. After completion of step 412, method 214 may proceed again to step 408.

At step 414, peripheral device 101 may determine whether a power at second USB-C port 104 is greater than a USB default power amount. If the power at second USB-C port 104 is not greater than the USB default power amount, method 214 may proceed to step 416. Otherwise, if the power at second USB-C port 104 is greater than the USB default power amount, method 214 may proceed to step 418.

At step 416, peripheral device 101 may negotiate a lower source power contract. After completion of step 416, method 214 may proceed again to step 408.

At step 418, peripheral device 101 may increase threshold voltage $V_{TH1}$. At step 420, peripheral device 101 may determine if a first port voltage is below threshold voltage $V_{TH1}$. If the first port voltage is not below threshold voltage $V_{TH1}$, method 214 may proceed again to step 408. Otherwise, if the first port voltage is below threshold voltage $V_{TH1}$, method 214 may proceed to step 422.

At step 422, peripheral device 101 may end active charge through. After completion of step 422, step 214 of method 200B may proceed to step 216.

Although FIG. 8 discloses a particular number of steps to be taken with respect to method 214, method 214 may be executed with greater or fewer steps than those depicted in FIG. 8. In addition, although FIG. 8 discloses a certain order of steps to be taken with respect to method 214, the steps comprising method 214 may be completed in any suitable order.

Method 214 may be implemented using peripheral device 101, components thereof, or any other system operable to implement method 214. In certain embodiments, method 214 may be implemented partially or fully in software and/or firmware embodied in computer-readable media.

Figure 9A:
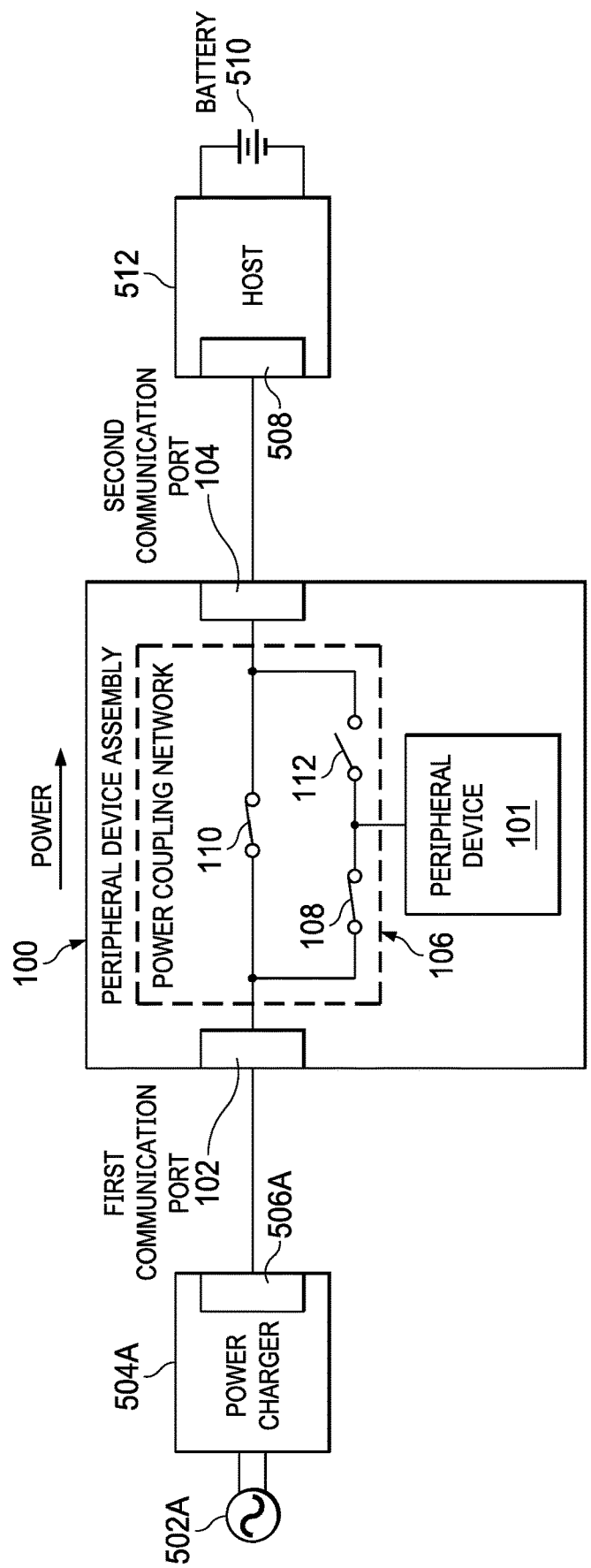
FIG. 9A illustrates a block diagram of an example peripheral device coupled to a power charger and a host powered by a battery, in accordance with embodiments of the present disclosure.

FIG. 9A illustrates a block diagram of an example peripheral device 101 coupled to a power charger 504A via first communication port 102 and a host 512 powered by a battery 510, wherein host 512 is coupled via second communication port 104, in accordance with embodiments of the present disclosure. Peripheral device 101 includes power coupling network 106 that may be managed and operated by a port policy management for enabling and disabling active charge through (or active-charge-through) operation through peripheral device assembly 100. The port policy management may be controlled within the power coupling network 106 or as a separate block (not shown) outside of the power coupling network 106. The port policy management may detect whether a valid power connection exists at the peripheral device 101. In FIG. 9A, a valid power connection exists and may be detected at first communication port 102 because power charger 504A, which is coupled to a power source 502A via port 506A of power charger 504A, is coupled to first communication port 102.

In response to the valid power connection being detected, a relationship between the first communication port 102 and the second communication port 104 may be determined. In FIG. 9A, the first communication port 102 may have the power role because it is coupled to power charger 504A that is, in turn, coupled to power source 502A. The second communication port 104 may be determined in this case to not take on the power role, even though second communication port 104 is coupled to host 512 via port 508 in which host 512 is driven by battery 510. Because the power relationship is determined that first communication port 102 is to have the power role and second communication port 104 is to not have the power role, peripheral device 101 may selectively negotiate between first communication port 102 and second communication port 104 so that first communication port 102 may be assigned the power role while second communication port may not be assigned the power role. After peripheral device 101 negotiates the power role, power coupling network 106 may selectively couple first communication port 102, second communication port 104, and peripheral device 101 to match a power contract. Peripheral device 101 may also negotiate a power contract with second communication port 104 so that a sum of a power representative of a current of the peripheral device 101 and a maximum power of second communication port 104 is less than or equal to a power contract with first communication port 102.

Depending upon the power contract, power coupling network 106 may be controlled to respectively allow or not allow active charge through (or active-charging-through) operation through peripheral device assembly 100 as well as the direct charging of peripheral device 101 itself. For the embodiments represented by FIG. 9A and based on the power contract, power coupling network 106 may be controlled so that switches 108 and 110 are activated (e.g., on, enabled, closed) while switch 112 is deactivated (e.g., off, disabled, open). Activated switch 108 may allow for directly charging peripheral device 101 itself via first communication port 102 while activated switch 110 may allow for active charge through (or active-charging-through) of peripheral device 101 from first communication port 102 to second communication port 104 so that power charger 504A driven by power source 502A also charges battery 510 of host 512. Switch 112 may remain deactivated so that host 512 may be prevented from having the power role and from being in a power contract to provide power from host 512.

For the embodiments represented by FIG. 9A, the valid power connection may be at first communication port 102 only, and thus first communication port 102 only may have the power role. For this case, the power contract allows the active charge through (or active-charging-through) of peripheral device assembly 100 from first communication port 102 to second communication port 104.

Figure 9B:
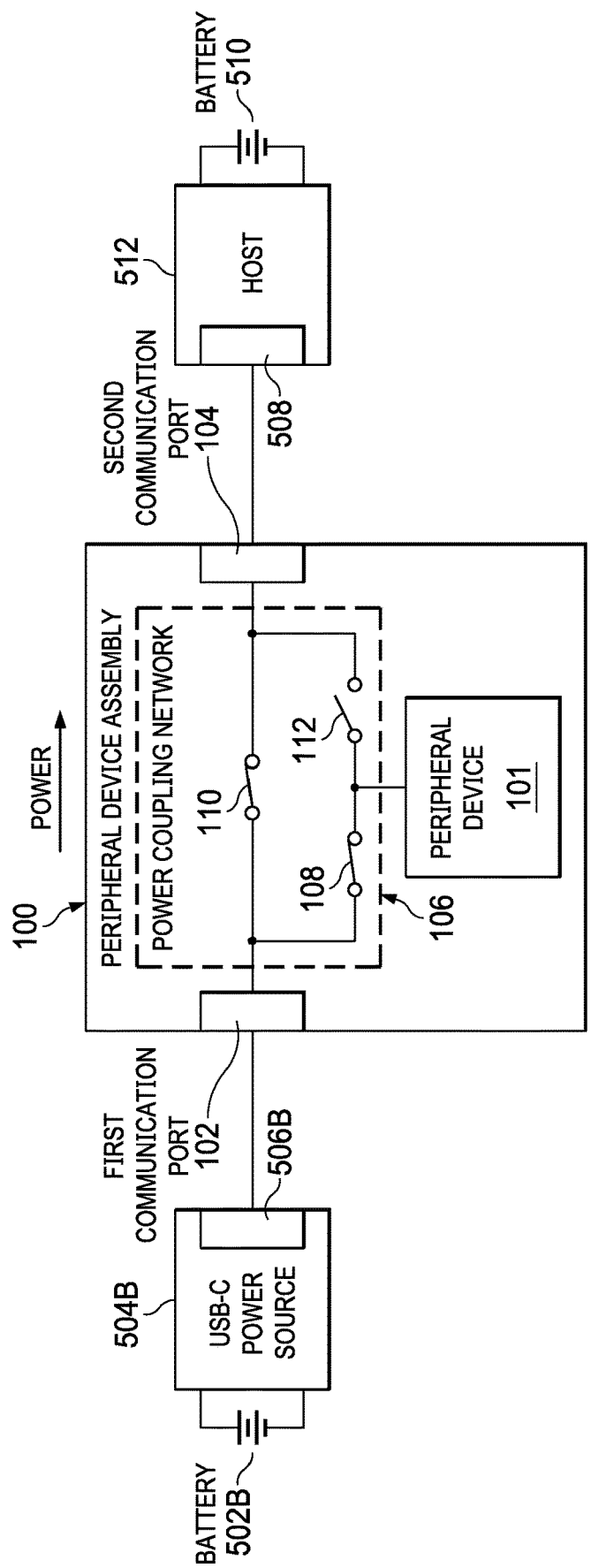
FIG. 9B illustrates a block diagram of an example peripheral device coupled to a power source driven by a battery and a host powered by another battery, in accordance with embodiments of the present disclosure.

FIG. 9B illustrates a block diagram of an example peripheral device 101 coupled to a power source 504B driven by a battery 502B and a host 512 powered by another battery 510, in accordance with embodiments of the present disclosure. FIG. 9B may be similar to FIG. 9A in all material respects, except that first communication port 102 may be coupled to a power source 504B driven by a battery 502B. Thus, the power source is not in any way limited to a specific power source but may be a power charger driven by a power source, a battery driving a power source, or any other suitable source that provides power to peripheral device 101.

If the valid power connection has decoupled and is no longer detected at first communication port 102, such as power charger 504A being unplugged from power source 502A in the embodiments represented by FIG. 9A or battery 502B being decoupled from first communication port 102 or fully discharging in the embodiments represented by FIG. 9B, power coupling network 106 may be controlled to disable the active charge through (or active-charge-through) of peripheral device assembly 100.

Figure 9C:
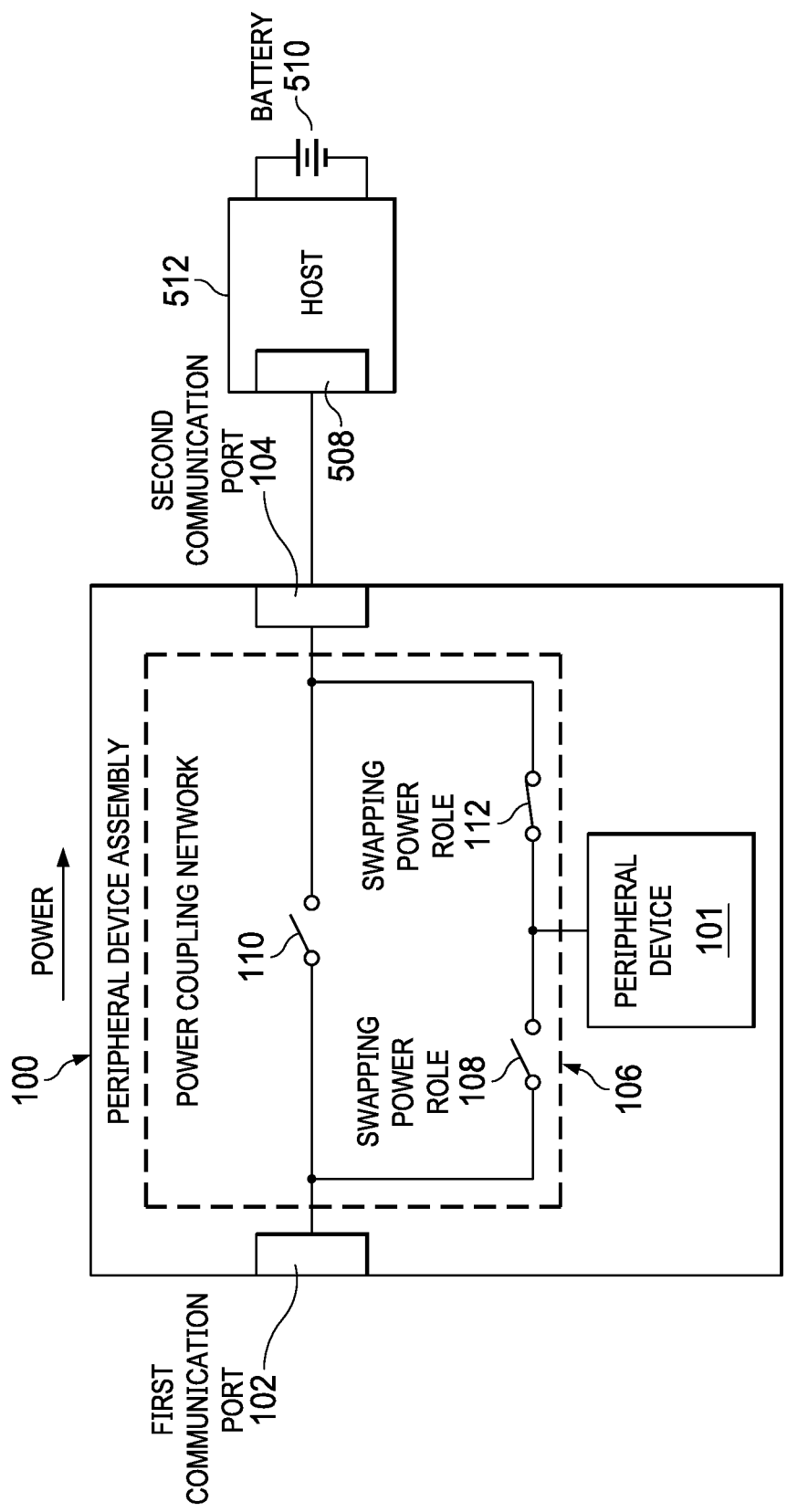
FIG. 9C illustrates a block diagram of an example peripheral device in which only a host powered by a battery is coupled to the second communication port and nothing is coupled to the first communication port, in accordance with embodiments of the present disclosure.

FIG. 9C illustrates a block diagram of an example peripheral device 101 in which only a host 512 powered by a battery 510 is coupled to second communication port 104 and nothing is coupled to first communication port 102, in accordance with embodiments of the present disclosure. Thus, FIG. 9C may be similar in all material respects to FIG. 9A or FIG. 9B except that a device(s) at the first communication port 102 is not coupled or decoupled from that port.

In the embodiments represented by FIG. 9C, a detection may be performed to determine whether a valid power connection exists at second communication port 104. In response to the valid power connection being detected at second communication port 104, the port policy management may swap the power role from first communication port 102 to second communication port 104 and may also switch the power contract to allow the power to be provided to peripheral device 101 from second communication port 104. In a USB-C implementation of peripheral device 101 and host 512 in FIG. 9C, the power role swap may be accomplished by the port policy management signaling a fast role swap from first communication port 102 (e.g., first USB-C port) to second communication port 104 (e.g., second USB-C port).

In FIG. 9C, if the valid power connection is no longer detected at second communication port 104, a determination may be made whether a physical connection exists at first communication port 102. In response to the physical connection being detected at first communication port 102, a lower current power contract may be selectively negotiated with second communication port 104 or the current draw of peripheral device 101 may be reduced.

As discussed with method 214 for adjusting a threshold voltage as described above with reference to FIG. 8, the valid power connection may be detected at first communication port 102 (e.g., first USB-C port) by comparing the bus voltage to a first threshold voltage $V_{TH1}$, and the valid power connection may be detected at second communication port 104 (e.g., second USB-C port) by comparing the bus voltage to a second threshold voltage $V_{TH2}$. First threshold voltage $V_{TH1}$ may be higher than second threshold voltage $V_{TH2}$, and second threshold voltage $V_{TH2}$ may be equal to the minimum valid voltage for the power contract. A difference between first threshold voltage $V_{TH1}$ and second threshold voltage $V_{TH2}$ may be greater than or equal to a voltage drop between first communication port 102 (e.g., first USB-C port) and second communication port 104 (e.g., second USB-C port) during active charge through (or active-charge-through) operation of peripheral device 101 (e.g., USB-C device) from first communication port 102 and second communication port 104. The voltage drop may be a value stored within a non-volatile memory within the peripheral device 101 (e.g., USB-C device). When the physical connection is detected at first communication port 102, first threshold voltage $V_{TH1}$ may be increased.

The voltage drop may be determined by peripheral device 101 (e.g., USB-C device) by: 1) measuring the voltage at first communication port 102 (e.g., first USB-C port); 2) measuring the voltage at second communication port 104 (e.g., second USB-C port); 3) measuring a current through power coupling network 106, that is, the active charging network; and 4) calculating a resistance between first communication port 102 and second communication port 104 (e.g., first USB-C port and second USB-C port).

As indicated before, example power sources may be provided through a power charger coupled to a power source or a battery that provides a power source. The battery may be the battery of a host, such as host 512 of FIGS. 9A, 9B, and 9C. An example of how the valid power connection may no longer be detected at one of first communication port 102 and second communication port 104 may be when the power charger is decoupled from the power source or the battery is decoupled from the host or the battery is fully discharged or no longer has a sufficient amount of power for operating or powering devices. When the valid power connection is no longer detected by the peripheral device 101, the active charge through (or active-charging-through) operation of the peripheral device 101 may be disabled.

The valid power connection may also exist at both first communication port 102 and second communication port 104. When the valid power connection exists at both first communication port 102 and second communication port 104, the port policy management may need to determine which of the two communication ports is to have the power role and to also provide the power contract that determines the direction of the active charge through (or active-charge-through) operation within the peripheral device 101, that is, whether the active charge through (or active-charge-through) operation is from first communication port 102 to second communication port 104 or alternately from second communication port 104 to first communication port 102.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method for port policy management for active charge through of a peripheral device that operates on a communication protocol and has a first communication port and a second communication port wherein the first communication port and the second communication port each comprises a respective first electrical contact for carrying signals of the communication protocol and a respective second electrical contact for transmitting and receiving electrical power from a source of electrical energy, the method comprising:
   detecting whether a valid power connection exists at the peripheral device;
   in response to detecting the valid power connection, determining a relationship between the first communication port and the second communication port;
   based on the relationship, determining, by the peripheral device, a power relationship among the peripheral device, the first communication port, and the second communication port;
   selectively configuring the first communication port, the second communication port, and the peripheral device to match the power relationship; and
   enabling active charging through of the peripheral device if active charging through is supported by the power relationship.

2. The method of claim 1, wherein determining the power relationship comprises selectively negotiating, by the peripheral device, a negotiated power role for one of the first communication port and the second communication port.

3. The method of claim 2, wherein configuring the first communication port, the second communication port, and the peripheral device to match the negotiated power role comprises:
   electrically coupling the second contact of the first communication port to the second contact of the second communication port; and
   selectively enabling one of the first contact of the first communication port and the first contact of the second communication port for communication by the peripheral device via the communication protocol.

4. The method of claim 3, further comprising, based on the negotiated power role, selecting one of the following steps to be performed:
   enabling the peripheral device to draw power from the first communication port; and
   enabling the peripheral device to draw power from the second communication port.

5. The method of claim 3, the method further comprising, when the valid power connection exists at the first communication port only and the first communication port only has the power role:
   enabling the peripheral device to draw power from the second contact of the first communication port;
   enabling active charging through of the peripheral device from the second contact of the first communication port to the second contact of the second communication port; and
   enabling signals of the communication protocol to be carried only to and from the first contact of the second communication port.

6. The method of claim 5, further comprising:
   in response to the valid power connection no longer being detected at the first communication port:

disabling charging of the peripheral device from the first communication port;

disabling active charging through of the peripheral device; and detecting whether the valid power connection exists at the second communication port; and in response to the valid power connection being detected at the second communication port:

swapping the negotiated power role from the first communication port to the second communication port; and enabling the peripheral device to draw power from the second communication port.

7. The method of claim 6, further comprising, in response to a chargeable device again being coupled to the first communication port, enabling active charging through of the peripheral device from the second contact of the second communication port to the second contact of the first communication port.

8. The method of claim 3, the method further comprising, when the valid power connection exists at the second communication port only and the second communication port only has the power role:

enabling the peripheral device to draw power from the second contact of the second communication port; and enabling active charging through of the peripheral device from the second contact of the second communication port to the second contact of the first communication port; and enabling signals of the communication protocol to be carried only to and from the first contact of the first communication port.

9. The method of claim 8, further comprising:

in response to the valid power connection no longer being detected at the second communication port:

disabling charging of the peripheral device from the second communication port;

disabling active charging through of the peripheral device; and detecting whether the valid power connection exists at the first communication port; and in response to the valid power connection being detected at the first communication port:

swapping the negotiated power role from the second communication port to the first communication port; and enabling the peripheral device to draw power from the first communication port.

10. The method of claim 9, further comprising, in response to a chargeable device again being coupled to the second communication port, enabling active charging through of the peripheral device from the second contact of the first communication port to the second contact of the second communication port.

11. The method of claim 8, further comprising:

in response to the valid power connection no longer being detected at the second communication port, determining whether a physical connection exists at the first communication port; and in response to the physical connection being detected at the first communication port, selecting performance of one of the following:

negotiating a lower power role for the second communication port; and reducing a power draw of the peripheral device.

12. The method of claim 2, further comprising, responsive to the valid power connection being detected at both the first communication port and the second communication port:

determining which of the first communication port and the second communication port is to have the power role; and determining whether active charging through of the peripheral device will be from the first communication port to the second communication port or from the second communication port to the first communication port.

13. The method of claim 2, wherein the communication protocol is a Universal Serial Bus (USB) protocol, the first communication port is a first USB-C port, and the second communication port is a second USB-C port, and the peripheral device is a USB-C device.

14. The method of claim 13, wherein the negotiated power role provides a direction and a magnitude of power in compliance with a USB-PD explicit contract and a USB-C power specification.

15. The method of claim 13, further comprising, in response to the source of electrical energy switching from one of the first USB-C port and the second USB-C port to the other of the first USB-C port and the second USB-C port, swapping the negotiated power role.

16. The method of claim 15, further comprising signaling a fast role swap with the second USB-C port.

17. The method of claim 13, wherein:

the valid power connection is detected at the first USB-C port by comparing a bus voltage to a first threshold voltage; and the valid power connection is detected at the second USB-C port by comparing the bus voltage to a second threshold voltage lesser than the first threshold voltage and equal to a minimum valid voltage for a power contract.

18. The method of claim 17, wherein a difference between the first threshold voltage and the second threshold voltage is greater than or equal to a voltage drop between the first USB-C port and the second USB-C port during active charging through of the USB-C device from the first USB-C port to the second USB-C port.

19. The method of claim 17, wherein a difference between the first threshold voltage and the second threshold voltage is stored in a non-volatile memory of the USB-C device.

20. The method of claim 17, further comprising, in response to a physical connection being detected at the first USB-C port, increasing the first threshold voltage.

21. The method of claim 17, further comprising the USB-C device negotiating the power contract with the second USB-C port so that a sum of power representative of a current of the USB-C device and a maximum port power is less than or equal to the power contract with the first USB-C port.

22. The method of claim 2, wherein in the communication protocol is a Lightning communication protocol, the first communication port is a Lightning communication port, the second communication port is a Lightning communication port, and the peripheral device is a Lightning device.

23. The method of claim 22, wherein the negotiated power role provides a direction and a magnitude of power in compliance with the Lightning communication protocol.

24. The method of claim 1, wherein:

the valid power connection exists at the first communication port when the source of electrical energy is coupled to the first communication port; and the valid power connection exists at the second communication port when the source of electrical energy is coupled to the second communication port.

25. The method of claim 24, wherein the source of electrical energy comprises one of a battery and a power charger.

26. The method of claim 25, wherein the valid power connection is no longer detected in response to one of the following:
the power charger being decoupled from its own source of electrical energy;
the battery has been discharged; and
the battery is unable to deliver a sufficient amount of power to the device.

27. The method of claim 24, wherein the source of electrical energy is a battery of a communication protocol host.

28. The method of claim 1, further comprising in response to the valid power connection not being detected by the peripheral device, disabling active charging through of the peripheral device.

29. The method of claim 1, further comprising:
estimating power losses associated with charging a host through one of the first communication port and the second communication port; and
accounting for the power losses when the power is being provided to the host via active charging through of the peripheral device.

30. The method of claim 29, wherein power losses are determined by:
measuring a first voltage at the first communication port;
measuring a second voltage at the second communication port;
measuring a current through a power coupling network that is used for active charging through; and
calculating a resistance between the first communication port and the second communication port.

31. A method for port policy management for active charge through of a peripheral device that operates on a communication protocol and has a first communication port and a second communication port wherein the first communication port and the second communication port each comprises a respective first electrical contact for carrying signals of the communication protocol and a respective second electrical contact for transmitting and receiving electrical power from a source of electrical energy, the method comprising:
estimating power losses associated with charging a host coupled to the peripheral device through one of the first communication port and the second communication port; and
accounting for the power losses when the power is being provided to the host via active charging through of the peripheral device between the second electrical contact of the first communication port and the second electrical contact of the second communication port.

32. The method of claim 31, wherein power losses are determined by:
measuring a first voltage at the first communication port;
measuring a second voltage at the second communication port;
measuring a current through a power coupling network that is used for active charging through; and
calculating a resistance between the first communication port and the second communication port.

33. A peripheral device that operates on a communication protocol, the peripheral device within a peripheral device assembly comprising:
a first communication port;
a second communication port, wherein the first communication port and the second communication port each comprises a respective first electrical contact for carrying signals of the communication protocol and a respective second electrical contact for transmitting and receiving electrical power from a source of electrical energy; and
the peripheral device, which is configured to perform port policy management for active charge through of the peripheral device and configured to:
detect whether a valid power connection exists at the peripheral device;
in response to detecting the valid power connection, determining a relationship between the first communication port and the second communication port;
based on the relationship, determine a power relationship among the peripheral device, the first communication port, and the second communication port;
selectively configure the first communication port, the second communication port, and the peripheral device to match the power relationship; and
enable active charging through of the peripheral device if active charging through is supported by the power relationship.

34. The peripheral device of claim 33, further comprising determining the power relationship by selectively negotiating, by the peripheral device, a negotiated power role for one of the first communication port and the second communication port.

35. The peripheral device of claim 34, wherein the peripheral device is configured to configure the first communication port, the second communication port, and the peripheral device to match the negotiated power role by:
electrically coupling the second contact of the first communication port to the second contact of the second communication port;
selectively enabling one of the first contact of the first communication port and the first contact of the second communication port for communication by the peripheral device via the communication protocol.

36. The peripheral device of claim 35, wherein the peripheral device is further configured to, based on the negotiated power role, select one of the following steps to be performed:
enable the peripheral device to draw power from the first communication port; and
enable the peripheral device to draw power from the second communication port.

37. The peripheral device of claim 35, wherein the peripheral device is further configured to, when the valid power connection exists at the first communication port only and the first communication port only has the power role:
enable the peripheral device to draw power from the second contact of the first communication port;
enable active charging through of the peripheral device from the second contact of the first communication port to the second contact of the second communication port; and
enable signals of the communication protocol to be carried only to and from the first contact of the second communication port.

38. The peripheral device of claim 37, wherein the peripheral device is further configured to:

in response to the valid power connection no longer being detected at the first communication port:
  disable charging of the peripheral device from the first communication port;
  disable active charging through of the peripheral device; and
  detect whether the valid power connection exists at the second communication port; and
in response to the valid power connection being detected at the second communication port:
  swap the negotiated power role from the first communication port to the second communication port; and
  enable the peripheral device to draw power from the second communication port.

39. The peripheral device of claim 38, wherein the peripheral device is further configured to, in response to a chargeable device again being coupled to the first communication port, enable active charging through of the peripheral device from the second contact of the second communication port to the second contact of the first communication port.

40. The peripheral device of claim 35, wherein the peripheral device is further configured to, when the valid power connection exists at the second communication port only and the second communication port only has the power role:
  enable the peripheral device to draw power from the second contact of the second communication port;
  enable active charging through of the peripheral device from the second contact of the second communication port to the second contact of the first communication port; and
  enable signals of the communication protocol to be carried only to and from the first contact of the first communication port.

41. The peripheral device of claim 40, wherein the peripheral device is further configured to:
in response to the valid power connection no longer being detected at the second communication port:
  disable charging of the peripheral device from the second communication port;
  disable active charging through of the peripheral device; and
  detect whether the valid power connection exists at the first communication port; and
in response to the valid power connection being detected at the first communication port:
  swap the negotiated power role from the second communication port to the first communication port; and
  enable the peripheral device to draw power from the first communication port.

42. The peripheral device of claim 41, wherein the peripheral device is further configured to, in response to a chargeable device again being coupled to the second communication port, enable active charging through of the peripheral device from the second contact of the first communication port to the second contact of the second communication port.

43. The peripheral device of claim 40, wherein the peripheral device is further configured to:
in response to the valid power connection no longer being detected at the second communication port, determine whether a physical connection exists at the first communication port; and
in response to the physical connection being detected at the first communication port, selecting performance of one of the following:
  negotiate a lower power role for the second communication port; and
  reduce a power draw of the peripheral device.

44. The peripheral device of claim 34, wherein the peripheral device is further configured to, responsive to the valid power connection being detected at both the first communication port and the second communication port:
  determine which of the first communication port and the second communication port is to have the power role; and
  determine whether active charging through of the peripheral device will be from the first communication port to the second communication port or from the second communication port to the first communication port.

45. The peripheral device of claim 34, wherein the communication protocol is a Universal Serial Bus (USB) protocol, the first communication port is a first USB-C port, and the second communication port is a second USB-C port, and the peripheral device is a USB-C device.

46. The peripheral device of claim 45, wherein the negotiated power role provides a direction and a magnitude of power in compliance with a USB-PD explicit contract and a USB-C power specification.

47. The peripheral device of claim 45, wherein the peripheral device is further configured to, in response to the source of electrical energy switching from one of the first USB-C port and the second USB-C port to the other of the first USB-C port and the second USB-C port, swap the negotiated power role.

48. The peripheral device of claim 47, wherein the peripheral device is further configured to signal a fast role swap with the second USB-C port.

49. The peripheral device of claim 45, wherein:
the valid power connection is detected at the first USB-C port by comparing a bus voltage to a first threshold voltage; and
the valid power connection is detected at the second USB-C port by comparing the bus voltage to a second threshold voltage lesser than the first threshold voltage and equal to a minimum valid voltage for a power contract.

50. The peripheral device of claim 49, wherein a difference between the first threshold voltage and the second threshold voltage is greater than or equal to a voltage drop between the first USB-C port and the second USB-C port during active charging through of the USB-C device from the first USB-C port to the second USB-C port.

51. The peripheral device of claim 49, wherein the peripheral device is further configured to store a difference between the first threshold voltage and the second threshold voltage in a non-volatile memory of the USB-C device.

52. The peripheral device of claim 49, wherein the peripheral device is further configured to, in response to a physical connection being detected at the first USB-C port, increase the first threshold voltage.

53. The peripheral device of claim 49, wherein the peripheral device is further configured to cause the USB-C device to negotiate the power contract with the second USB-C port so that a sum of power representative of a current of the USB-C device and a maximum port power is less than or equal to the power contract with the first USB-C port.

54. The peripheral device of claim 34, wherein the communication protocol is a Lightning communication protocol, the first communication port is a Lightning communication port, the second communication port is a Lightning communication port, and the peripheral device is a Lightning device.

55. The peripheral device of claim 54, wherein the negotiated power role provides a direction and a magnitude of power in compliance with the Lightning communication protocol.

56. The peripheral device of claim 33, wherein:
the valid power connection exists at the first communication port when the source of electrical energy is coupled to the first communication port; and
the valid power connection exists at the second communication port when the source of electrical energy is coupled to the second communication port.

57. The peripheral device of claim 56, wherein the source of electrical energy comprises one of a battery and a power charger.

58. The peripheral device of claim 57, wherein the valid power connection is no longer detected in response to one of the following:
the power charger being decoupled from its own source of electrical energy;
the battery has been discharged; and
the battery is unable to deliver a sufficient amount of power to the device.

59. The peripheral device of claim 56, wherein the source of electrical energy is a battery of a communication protocol host.

60. The peripheral device of claim 33, wherein the peripheral device is further configured to, in response to the valid power connection not being detected by the peripheral device, disable active charging through of the peripheral device.

61. The peripheral device of claim 33, wherein the peripheral device is further configured to:
estimate power losses associated with charging a host through one of the first communication port and the second communication port; and
account for the power losses when the power is being provided to the host via active charging through of the peripheral device.

62. The peripheral device of claim 61, wherein the peripheral device is further configured to determine the power losses by:
measuring a first voltage at the first communication port;
measuring a second voltage at the second communication port;
measuring a current through a power coupling network that is used for active charging through; and
calculating a resistance between the first communication port and the second communication port.

63. A peripheral device that operates on a communication protocol, the peripheral device within a peripheral device assembly comprising:
a first communication port;
a second communication port, wherein the first communication port and the second communication port each comprises a respective first electrical contact for carrying signals of the communication protocol and a respective second electrical contact for transmitting and receiving electrical power from a source of electrical energy; and
the peripheral device, wherein the peripheral device is configured to perform port policy management for active charge through of the peripheral device and configured to:
estimate power losses associated with charging a host coupled to the device through one of the first communication port and the second communication port; and
account for the power losses when the power is being provided to the host via active charging through of the peripheral device between the second electrical contact of the first communication port and the second electrical contact of the second communication port.

64. The peripheral device of claim 63, wherein determining the power losses comprises:
measuring a first voltage at the first communication port;
measuring a second voltage at the second communication port;
measuring a current through a power coupling network that is used for active charging through; and
calculating a resistance between the first communication port and the second communication port.

* * * * *